United States Patent  
Covington et al.

(10) Patent No.: US 9,156,567 B2  
(45) Date of Patent: Oct. 13, 2015

(54) SYSTEM AND METHOD FOR ECONOMIC USAGE OF AN AIRCRAFT

(71) Applicant: Bell Helicopter Textron Inc., Fort Worth, TX (US)

(72) Inventors: Charles Eric Covington, Colleyville, TX (US); Brian E. Tucker, Fort Worth, TX (US); Thomas B. Priest, North Richland Hills, TX (US); David A. Platz, North Richland Hills, TX (US); James M. McCollough, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/338,944

(22) Filed: Jul. 23, 2014

(65) Prior Publication Data  
US 2014/0336867 A1 Nov. 13, 2014

Related U.S. Application Data

(63) Continuation of application No. 13/868,159, filed on Apr. 23, 2013, now Pat. No. 8,825,237.

(60) Provisional application No. 61/638,732, filed on Apr. 26, 2012.

(51) Int. Cl.  
*B64F 5/00* (2006.01)  
*G01C 23/00* (2006.01)  
*B64D 45/00* (2006.01)

(52) U.S. Cl.  
CPC .............. *B64F 5/0045* (2013.01); *B64D 45/00* (2013.01); *G01C 23/00* (2013.01)

(58) Field of Classification Search  
CPC ........ B64F 5/0045; B64D 45/00; G01C 23/00  
USPC ....................... 701/14, 4, 5, 7, 8, 9  
See application file for complete search history.

(56) References Cited

U.S. PATENT DOCUMENTS 4,312,041 A * 1/1982 DeJonge ........................ 701/123  
5,329,468 A 7/1994 Tsukahara et al.  
(Continued)

FOREIGN PATENT DOCUMENTS

EP 2040240 A2 3/2009  
EP 2040240 A3 2/2010  
EP 2725337 A1 * 4/2014

OTHER PUBLICATIONS

Canadian Office Action in related Canadian Application No. 2,813,974, dated Jul. 30, 2014, 2 pages.  
European Office Action in related European Application No. 13165371.9, dated Jul. 23, 2014, 8 pages.  
(Continued)

*Primary Examiner* — Mary Cheung  
*Assistant Examiner* — Brian P Sweeney  
(74) *Attorney, Agent, or Firm* — Noah A. Tevis (57) ABSTRACT

The present application relates to a system and method for providing real-time indications of economic impact of aircraft operations to an aircraft operator. The system and method allow the aircraft operator to reduce economic impact during flight of the aircraft. Such an analysis and cue to the aircraft operator allows the operator to make real-time changes during flight to reduce damage of life-limited aircraft components, thereby reducing the economic impact of aircraft operation that is directly associated with maintenance and component replacement. The system and method can also include pre-flight and post-flight analysis methods for reduction of economic impact of flight operations.

17 Claims, 7 Drawing Sheets

(56) References Cited

U.S. PATENT DOCUMENTS

| | | |
|---|---|---|
| 7,307,549 B2 | 12/2007 | Firra |
| 2007/0260726 A1* | 11/2007 | Rozak et al. .................. 709/224 |
| 2009/0070123 A1 | 3/2009 | Wise et al. |
| 2010/0077046 A1* | 3/2010 | Rigal et al. .................... 709/206 |
| 2010/0235019 A1 | 9/2010 | De Bono |

OTHER PUBLICATIONS

Office Action in related Canadian Application No. 2,813,974, dated Jul. 13, 2015, 4 pages.

Notice of Allowance (71-3) in related European Application No. 13165371.9, dated Feb. 18, 2015, 41 pages.

Translation of Chinese Office Action in related Chinese Application No. 201310149341.0, dated Jan. 29, 2015, 14 pages.

* cited by examiner

SYSTEM AND METHOD FOR ECONOMIC USAGE OF AN AIRCRAFT

BACKGROUND

1. Technical Field

The present application relates in general to a system and method for the economic optimization of aircraft operation.

2. Description of Related Art

Many operators of a rotorcraft, or a fleet of rotorcraft, are under tremendous pressure to operate the rotorcraft as efficiently as possible due to the narrow margins of the particular business. Substantial expenses can include fuel costs, maintenance costs, part replacement cost, and rotorcraft downtime cost, for example.

With regard to fuel usage, operators of rotorcraft may make rather rudimentary analysis of their flight operations to make adjustments to their flight procedures to attempt a reduction in fuel consumption. Such an analysis may include flying a first flight regime between a departure site to a destination site, then later flying a second flight regime between the departure site and the destination site, then comparing the fuel consumption to determine which flight regime is optimal.

Further, maintenance costs, part replacement costs, and rotorcraft downtime costs have typically been factored by analyzing historical operational data. However, such a practice produces only an approximate estimate and is very time consuming for the operator. Further, small operators may lack the experience and human capital required to perform the analysis.

Hence, there is a need for a system and method which allows a rotorcraft operator to improve and optimize economic usage of a rotorcraft.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
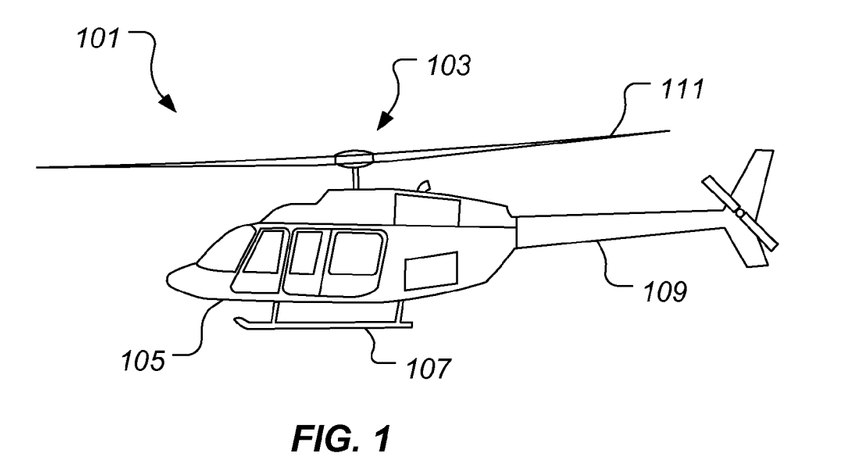
FIG. 1 is a side view of a rotorcraft, according to an embodiment of the present application.

Referring to FIG. 1 in the drawings, a rotorcraft 101 is illustrated. Rotorcraft 101 has a rotor system 103 with a plurality of rotor blades 111. The pitch of each rotor blade 111 can be selectively controlled in order to selectively control direction, thrust, and lift of rotorcraft 101. Rotorcraft 101 further includes a fuselage 105, landing gear 107, and a tail member 109.

Figure 2:
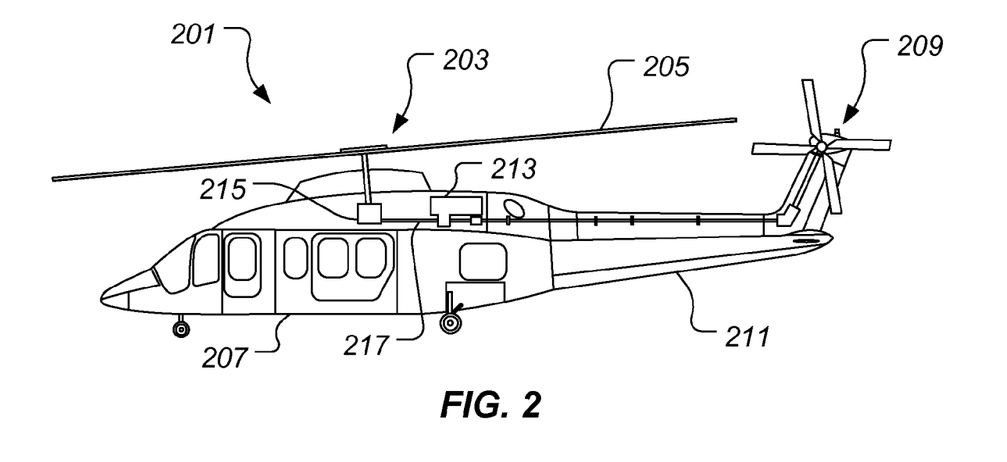
FIG. 2 is a perspective view of a rotorcraft, according to an embodiment of the present application.

Referring now to FIG. 2 in the drawings, a rotorcraft 201 is illustrated. Rotorcraft 201 has a rotor system 203 with a plurality of rotor blades 205. The pitch of each rotor blade 205 can be managed in order to selectively control direction, thrust, and lift of rotorcraft 201. Rotorcraft 201 can further include a fuselage 207, anti-torque system 209, and an empennage 211. Torque is supplied to rotor system 203 and anti-torque system 209 with at least one engine 213. A main rotor gearbox 215 is operably associated with an engine main output driveshaft 217 and the main rotor mast.

Rotorcraft 101 and rotorcraft 201 are exemplary of aircraft that can benefit from the systems and methods disclosed herein. Other aircraft can benefit from the systems and methods disclosed herein, as one of ordinary skill in the art would fully appreciate having the benefit of this disclosure. Other aircraft can include hybrid rotorcraft having a combination of a vertical lift rotor system and a forward thrust propulsion system, for example.

Further, the aircraft can have a plurality of sensors configured to conduct and communicate a variety of measurements, such as a fuel gauge, fuel flow meter, air temperature sensor, altimeter, engine torque meter, gas producer speed sensor, gas temperature sensor, engine bleed air sensor, main rotor mast torque sensor, generator load gauge sensor, weapons deployed, and cargo hook load cell, to name a few. The aircraft also includes a cockpit with an instrument panel that may take on a wide variety of designs. For example, the instrument panel can have conventional analog gauges. In another embodiment, the instrument panel can have a "glass cockpit" design in which one or more instruments are digitized and graphically displayed on one or more screens.

The system and method of the present application can be utilized to optimize the operation of a flying vehicle in order reduce expenses related to fuel consumption, life-limited component replacement, and/or maintenance costs. The system and method allows operators with multiple aircraft performing various missions to reschedule aircraft operations to achieve desired maintenance flow of the aircraft. It should be appreciated that the system and method of the present application are not limited to manned aircraft; rather the system and method of the present application can be implemented on unmanned aircraft as well.

Figure 3:
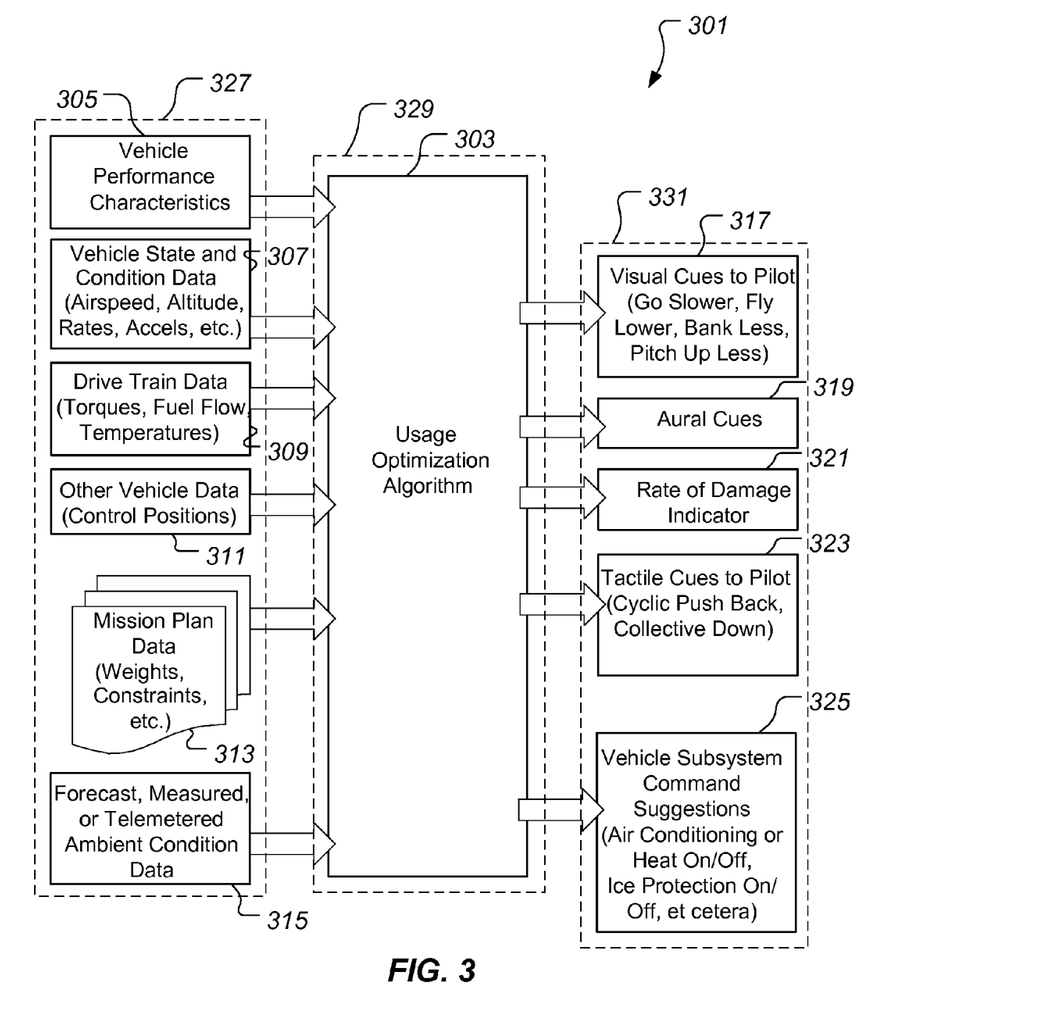
FIG. 3 is a schematic view of a method, according to an embodiment of the present application.

Referring to FIG. 3, a method 301 for optimizing economic operation of an aircraft is illustrated. Method 301 can include a step 327 of inputting data, a step 329 of processing the data in an algorithm 303, and a step 331 of cueing the pilot to make a change in aircraft operation to improve the economic operation thereof. Vehicle performance characteristics 305 can be communicated or retrieved by usage optimization algorithm 303 so that the measured data can be analyzed in accordance with the performance characteristics of the aircraft. In another embodiment, the vehicle performance characteristics 305 are embedded locally with the computer having the usage optimization algorithm 303. Further, method 301 can include inputting a specific configuration and updating the vehicle performance characteristics in accordance with the specific configuration. For example, if the flight configuration of the aircraft includes float bags coupled to the skid gear, then the aerodynamic drag data affecting the performance characteristics can also be updated to reflect the presence of the float bags. In another example, a weapons configuration (which also affects drag) can be input so that the algorithm 303 performs analysis with accurate aerodynamic drag data. Furthermore, vehicle performance characteristics are conventionally provided in a graphic chart format for reference by the pilot; however, method 301 can utilize vehicle performance characteristics 305 in electronic data format for calculation by algorithm 303, for example.

Step 327 of method 301 can include inputting vehicle state and condition data 307, such as airspeed, altitude, outside air temperature, body orientation, body angular rates, body angular acceleration, body linear acceleration, load factor, for example, to analyze the economic operation of the aircraft with algorithm 303. Further, vehicle usage data, such as drive train data 309 can also be utilized by the usage optimization algorithm 303. Drive train data 309 can include driveshaft torque and RPM (revolutions per minute) cycles, for example. Further, vehicle usage data, such as other vehicle data 311 can also be utilized by the usage optimization algorithm 303. Other vehicle data 311 can include control positions of the vehicle control system, such as position data of the collective, cyclic, and tail rotor pitch actuator positions.

The vehicle state and condition data 307, drive train data 309, as well as the other vehicle usage data 311, can be input into the algorithm 303 along with vehicle performance characteristics 305 and a forecast, measured, or telemetered ambient condition data 315 to determine if a change in state or condition (such as slowing down, flying lower, making turns at less angle of bank, pulling up less, for example), or a change in vehicle usage (decreasing active pilot technique, for example), or a change in operating profile (flying the mission at a different altitude, or a different sequence of waypoints, or at a different speed) would result in reduced operating costs, either due to reduced fuel consumption, reduced life-limited component damage, reduced maintenance, reduced replacement of "on condition" components, or reduced demand on vehicle subsystems, such as heating, air conditioning, ice protection, or vibration suppression. The optimization algorithm 303 can be modified to consider a mission plan 313 having one or more constraints, such as flight for minimum fuel burn, flight for minimum flight time, flight for minimum vibration, route and flight path constraints such as areas or altitudes to avoid, or weighted combinations thereof.

Usage optimization algorithm 303 can calculate a suggested change in vehicle operation that would produce an increase in optimization of the aircraft. The suggested change in vehicle operation can then be communicated to the pilot or operator in step 331. Step 331 can take on several different implementation specific embodiments. For example, a suggested change relating to typical flight parameters, such as airspeed, altitude, attitude, and acceleration, for example, can be cued as visual cues 317 to the pilot by, for example, an indication needle located on an instrument display so as to convey flight direction cues or trending indications. A suggested change relating to engine or drive train operation can be cued in a similar fashion on the instrument display. A suggested change relating to flight operation that is not directly indicated on an instrument can be communicated by a "rate of damage" indicator 321 normalized to nominal damage accrual on par with aircraft structural design criteria (such as due to fatigue damage), where an upscale indication indicates more expensive operation. Over time, through training and experience, the pilot can learn which maneuvers and pilot techniques tend to cause increased damage and will develop habits to avoid them. The real-time communication to the pilot via the damage meter 321 serves to reinforce positive pilot behavior more effectively than post-flight analysis and training. Vehicle subsystem command suggestions 325 or changes, such as changes to heating, air conditioning, or ice protection can be communicated to the pilot. Vehicle subsystem command suggestions 325 can be communicated via dedicated annunciators or text based pilot advisories, for example.

In an alternative embodiment, suggested changes can be communicated to the aircraft crew in step 331 by providing tactile cues 323, such as active force feedback into the cockpit controls, such as stick push back and collective pull down, for example. Further, suggested changes can be communicated by aural cues 319, such as tones, recorded speech, or synthesized speech, for example.

Referring still to FIG. 3, the algorithm 303 used in step 329 of method 301 can include simple single-input single-output functions (e.g. altitude or speed only), or can include complex multi-input multi-output optimization algorithms with weighting factors and mission constraints applied to achieve the best balance between mission effectiveness and operating economy. In one embodiment, algorithm 303 is configured to determine and analyze the rate of damage by recognizing that the aircraft is operating within one or more general flight parameters. For example, high airspeed and high altitude can be exemplary parameters that could generate a higher than nominal rate of damage. Moreover, the damage that can occur from flying at a high airspeed at a high altitude can be from an accelerated wear on a main rotor bearing that can experience extreme and high frequency loading during such a high airspeed and high altitude operation. It should be appreciated that the main rotor bearing is just an example of component that could experience an accelerated wear due to a particular flight condition and that one unique advantage of method 301 is that replacement or maintenance of any component that may experience accelerated wear in a particular flight condition can be reduced by making the operation or pilot aware. Method 301 can recognize the operation of the aircraft at the high altitude/high speed and cue the pilot that even small reduction and speed and altitude can greatly reduce the rate of wear on the bearing or other component, thereby saving the expense associated of premature replacement of the bearing or other component. In another implementation, method 301 can cue the pilot that the center of gravity of the aircraft is not optimal, which can further cause an increase of rate of wear of one or more aircraft components, such as a bearing. Once cued, the pilot can then decide to make a change in the loading of the aircraft to derive economic operation while taking into account flight requirements.

Other parameters can be used in the rate of damage calculation, such as air temperature, attitude, angular rates, and linear accelerations, for example. In another embodiment, the rate of damage calculation can also include the factoring of sensor data, such as vibration data measured from an accelerometer, for example. Aircraft operation that causes a higher than nominal amount of vibration can reduce component lives and increase unscheduled maintenance, thus the rate of damage indicator can indicate this to the aircraft operator.

Figure 4:
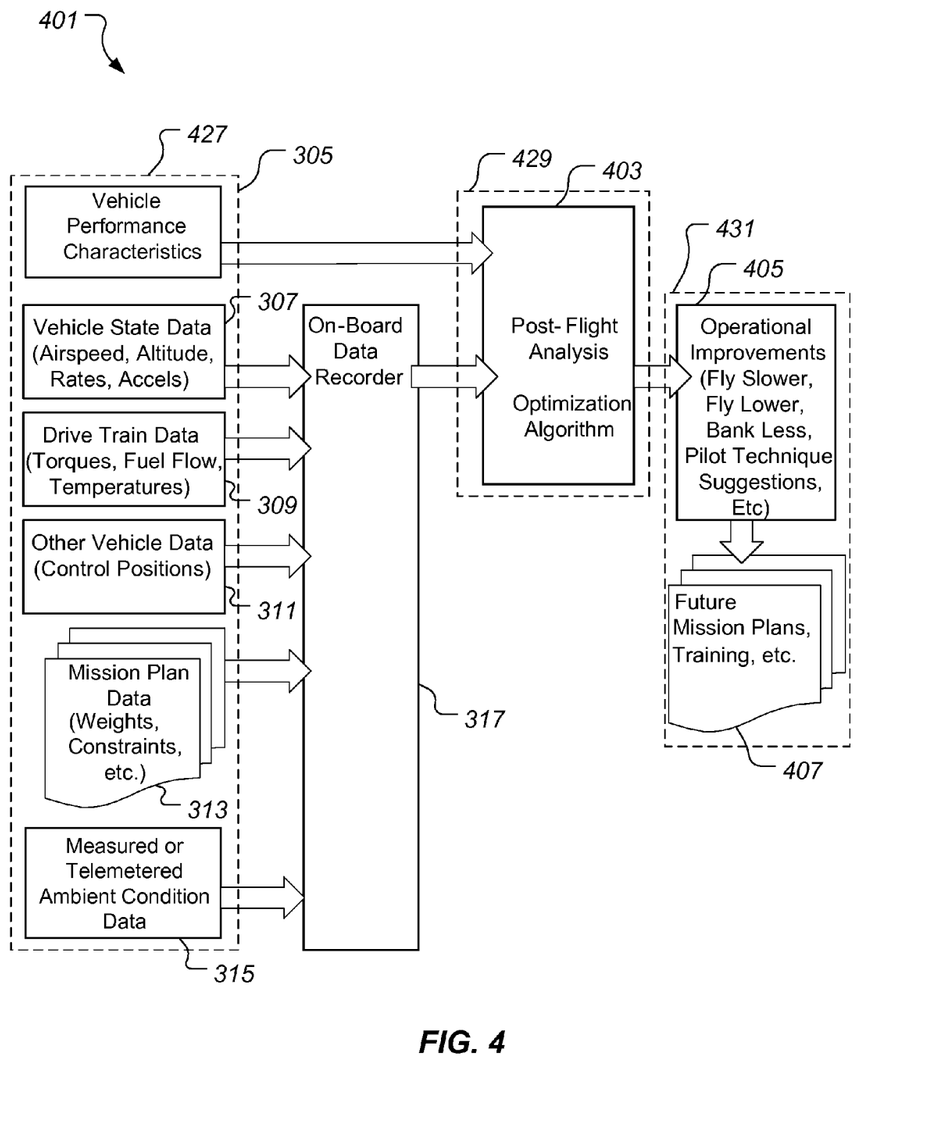
FIG. 4 is a schematic view of a method, according to an embodiment of the present application.

Referring now also to FIG. 4, method 401 can include analyzing data post-flight, using an algorithm 403 that is substantially similar to algorithm 303 used in method 301, to better sequence maintenance, to suggest improvements in operations (e.g. fly lower, fly slower, etc.), or to highlight operations or individual pilot techniques that adversely impact operating economy, for example. Method 401 can include a step 427 of inputting data, a step 429 of processing the data in an algorithm 403, and a step 431 of communicating to the pilot recommended changes in aircraft operation to improve the economic operation thereof. Method 401 is substantially similar to method 301, except as described herein. For example, method 401 includes recording the operational vehicle state data 307, drive train data 309, other vehicle data 311, mission plan data 313, and ambient condition data 315 with an on-board data recorder 317 rather than processing the data on-board and real-time, as discussed further with regard to method 301. Furthermore, vehicle performance characteristics 305, and the data from on-board data recorder 317 are analyzed in optimization algorithm 403. The product of optimization algorithm 403 can include operational improvements 405, such as instructions to fly slower, fly lower, make turns at lower angles of bank, and other pilot technique suggestions that can be conveyed to the pilot or operator in future mission plans or training 407, for example.

Future mission plans or training 407 are just one example of how operational improvements can be communicated to the pilot, operator, or third party; for example, in another embodiment electronic communication can be made to the pilot, operator, or third party, after the processing step 429 that can outline how the pilot could have flown the aircraft differently to derive more efficient operation of the aircraft. Further, an email can be sent to the pilot or operator so as to communicate the operational improvements so that the pilot can have the information quickly within termination of the flight which can have much greater impact as compared to a manual analysis performed days later.

Further, method 401 can be implemented to compute and track an aircraft operational carbon footprint, which can be useful for environmental impact tracking or Carbon Credits. The environmental impact can be calculated based upon not only fuel usage, but also the part replacement and maintenance also having a degree of environmental impact.

Figure 5:
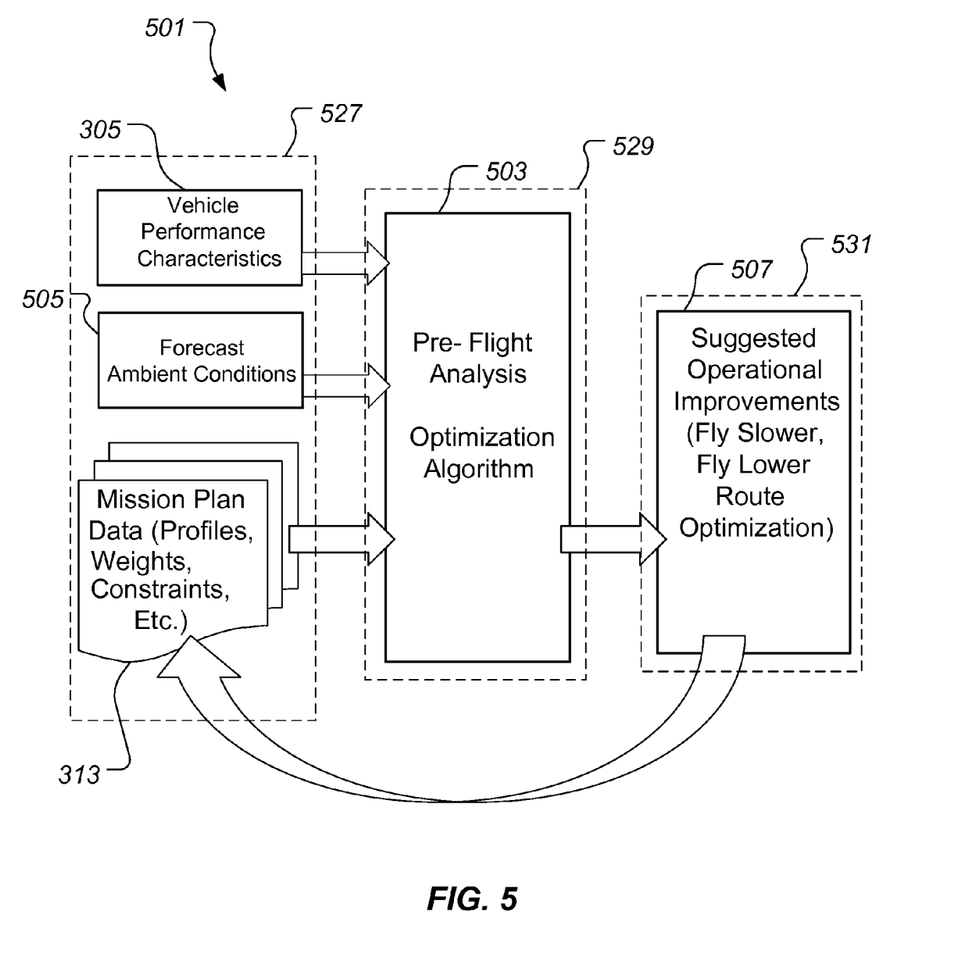
FIG. 5 is a schematic view of a method, according to an embodiment of the present application.

Referring now also to FIG. 5, method 501 can include analyzing pre-flight mission plans, the pre-flight mission plans being analyzed using an algorithm 503 that is similar to the algorithms 303 and 403 used in methods 301 and 401, respectively. Method 501 can include a step 527 of inputting data, a step 529 of processing the data in algorithm 503, and a step 531 of suggesting pre-flight operational improvements in aircraft operation to improve the economic operation during the planned flight.

Suggested mission planning improvements 507 can be incorporated into the pre-flight mission plans prior to flight. Such a capability can be integrated into a mission planning package, or hosted separately, with changes to the mission plan accomplished manually or in a separate software package. Optimization algorithm 503 can include analyzing the vehicle performance characteristics 305, the forecast ambient conditions 505, and the mission plan 313. Algorithm 503 can produce suggested operational improvements 507 in a variety of formats. For example, a change in weather forecast can be realized in forecast ambient conditions 505, then can be processed by algorithm 503, then communicated to the pilot or operator in an implementation specific format, such as email or message on the aircraft instrument panel, for example. Further, the pilot could receive the change as the pilot is performing a pre-flight routine. In one example, the change could prompt the pilot to lower the planned cruising altitude by 2000 feet in order to avoid an elevated headwind that would adversely affect efficiency.

Figure 6:
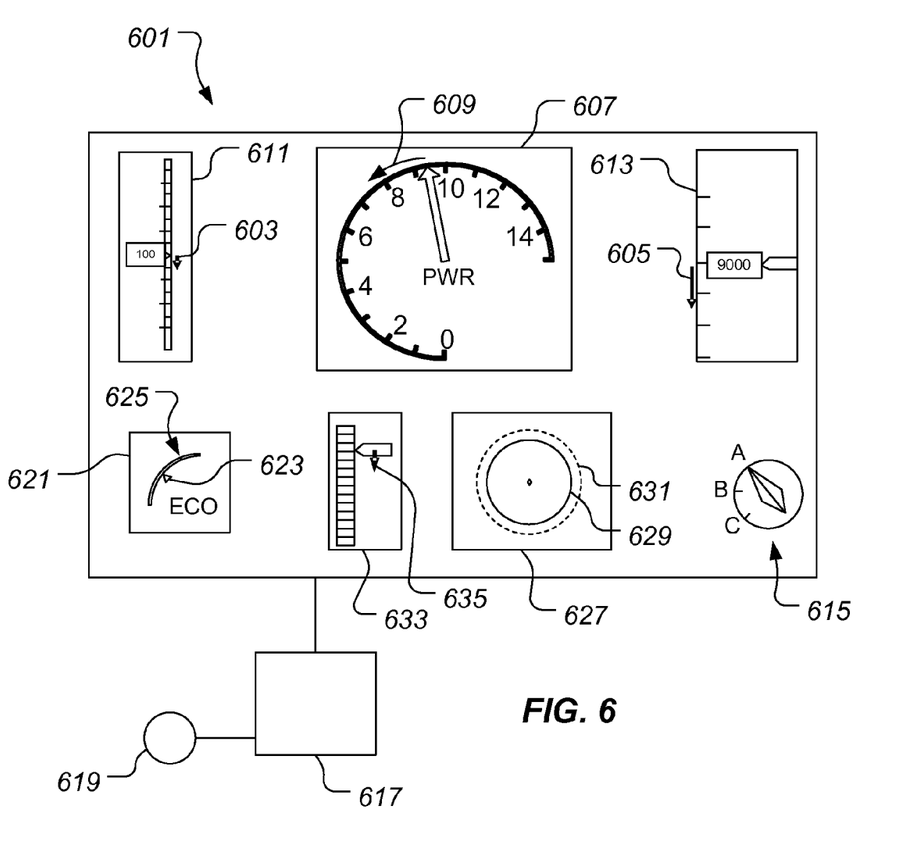
FIG. 6 is a graphical view of a flight instrument panel, according to an embodiment of the present application.

Referring to FIG. 6, illustrative embodiments of instrument indicators are depicted. Instrument panel 601 can include any variety of implementation specific instruments for flying an aircraft. For clarity, some instruments on instrument panel 601 are not illustrated. Instrument panel 601 can be in communication with a calculation unit 617 configured for performing one or more functions associated with method 301. Further, algorithm 303 can be processed in part or wholly within calculation unit 617. Further, one or more sensors 619 can be in data communication with calculation unit 617. As discussed further herein, sensors 619 can be any variety of sensors necessary for performing step 327 of method 301.

Indicator 603 is an indicator on a true airspeed instrument 611 for communicating a recommended change in airspeed to improve the economy of flight. For example, indicator 603 is illustrated in a "reduce speed" cue. The length and or size of indicator 603 can be configured to communicate a magnitude of the recommended change in airspeed. For example, the root end of indicator 603 corresponds with the current airspeed, while the tip end of indicator 603 is indicative of what airspeed the pilot should achieve, in reference to the scale on the true airspeed instrument 611. In the illustrated state, indicator 603 is communicating a relative small reduction in airspeed to improve the economy of flight, as indicator 603 is relatively short in length. In the illustrated embodiment, indicator 603 is an arrow, where the tip end is the narrow end portion of the arrow. Indicator 603 can be larger at high speeds or high power settings. It should be appreciated that indicator 603 is merely illustrative of variety of embodiments that can be implemented to communicate a recommended change in airspeed to improve the economy of flight.

An indicator 605 is an indicator on an altimeter 613 for communicating a recommended change in altitude to improve the economy of flight. For example, indicator 605 is illustrated in a "reduce altitude" cue which communicates that operating costs will be reduced by either reducing altitude. The length of indicator 605 is relatively long, which can indicate that a large change in altitude would improve economy of flight. For example, the root end of indicator 605 corresponds with the current altitude, while the tip end of indicator 605 is indicative of what altitude the pilot should achieve, in reference to the scale on the altimeter 613. In the illustrated state, indicator 605 is communicating a relatively large reduction in altitude to improve the economy of flight, as indicator 605 is relatively long in length. It should be appreciated that other styles of indicators can be used.

Furthermore, typical rotorcraft may increase fuel efficiency by increasing altitude because a turbine engine can produce a given power output at a higher altitude by increasing combustion temperature, which increases thermodynamic efficiency. Aircraft drag also decreases with increased altitude. For this reason, performance charts are created that document true airspeed versus power for various combinations of aircraft weight and density altitude. There can be an additional energy benefit to flying at a higher altitude in warm weather because the air conditioning requirements may be reduced or eliminated. However, if there is a 30 knot headwind at the altitude that the pilot believes is the optimal altitude (from a performance chart), but only a 10 knot headwind at an altitude 1000 feet lower, then it may be more efficient for the pilot to fly the aircraft 1000 feet lower in altitude, even though the performance chart indicated otherwise. Algorithm 303 can analyze the atmospheric data and then utilize indicator 605 to cue the pilot to reduce altitude by 1000 feet in order to take avoid the stronger headwind, thus realizing a gain in efficiency. The atmospheric data, which can include wind speed, wind direction, and air temperature, for example, can be received via satellite data links during flight.

An indicator 635 is a cue on a rotor speed gauge 633 indicating to a pilot to increase or decrease rotor speed in order to make a change in rotor speed so as increase efficiency. The length and/or size of indicator 635 can be configured to communicate a magnitude of the recommended change in rotor speed. For example, the root end of indicator 635 corresponds with the current rotor speed, while the tip end of indicator 635 is indicative of what rotor speed the pilot should achieve, in reference to the scale on the rotor speed gauge 633. In the illustrated embodiment, indicator 635 is an arrow, where the tip end is the narrow end portion of the arrow.

Regarding rotor speed, there can be a trade between rotor speed and vibration, thus a decrease may increase vibration, depending upon the vibration reduction system on the aircraft. Thus, in another implementation of selector 615 described below, a pilot can select a "passenger comfort" selection which can place a greater weight upon low cabin vibration so that the pilot isn't cued into an act that may increase cabin vibration for the sake of improving fuel economy. However, if the pilot is carrying only cargo, then the pilot may want to place a greater weight upon fuel economy, which the pilot can input into the system so that algorithm 303 factors accordingly.

The optimization algorithm 303 can weigh a variety of factors either automatically or selectively based upon pilot input. For example, algorithm 303 can be selectively modified to weigh certain factors to a greater or lesser extent. A selector 615 can be located on the instrument panel 601 to allow the pilot to make a selection in accordance with the most important factor. For example, the "A" selection can represent fuel efficiency, the "B" selection can represent component life and replacement cost, and "C" can represent maintenance costs and/or downtime associated with the aircraft being grounded for maintenance. As such, algorithm 303 can evaluate and factor component replacement expense, labor costs, and other costs associated with the reduction of life or damage of aircraft components and maintenance associated therewith due to the aircraft being flown in a certain way.

Further, the operator, pilot, or third party, can input data pertaining to the expense associated with certain operating expenses, such as part component prices, fuel price, labor costs, foreign import taxes, etc., which the algorithm 303 can evaluate. An operator can configure the cost calculations to reflect their unique cost situation, such as current fuel cost in price per gallon or price per pound for example. In another example, an operator can input and configure the analysis in terms of maintenance rate in price per maintenance man hour so as to include shop overhead if applicable, per day cost of aircraft down time (which might include performance penalty clause, daily cost of insurance and interest, for example, or current parts costs (an OEM can increase the cost of spares X %/year) and total parts costs or part cost multipliers which may include significant import duties.

During operation, the pilot may select "A" for fuel efficiency when fuel is a relatively expensive and the driving costs associated with operation of the aircraft, or maximum range is required, for example. The pilot may select "B" or "C" when fuel is relatively inexpensive resulting in operational costs being driven by the replacement cost of aircraft components and/or maintenance downtime. For example, if fuel is relatively cheap, an operator may be induced into having the pilot fly the aircraft at maximum continuous power (MCP) in order to minimize flight time. However, algorithm 303 can be utilized help the operator understand that the flying at MCP may increase loads upon life limited or replaceable parts dramatically, such that the expense associated with replacement of such parts and/or maintenance downtime, outweigh the benefit from a shorter flight time. Depending upon earnings and costs associated with flight time and downtime, respectively, algorithm can cue the pilot to modify operation of the aircraft to arrive at a most optimal operation setting.

In another embodiment, instrument panel 601 can include an indicator 609 associated with a power instrument 607 so as to communicate to the pilot that a decrease or increase in power, defined by indicator 609, would economically optimize operation of the aircraft in light of the aforementioned factors. In an alternative embodiment, indicator 609 is an indicator on a torque instrument that would cue the pilot to increase or decrease torque to arrive at an optimal operation.

Method 301 can be configured to only show one of the indicators at a time. For example, method 301 can include prioritizing the cues to the pilot in accordance with most effective cue being displayed first. If the largest potential gain could be realized by a change in altitude, then indicator 605 would be displayed. If the pilot determined that an altitude change was not practical or undesirable for some reason, then the pilot can make an input to prompt the second most effective cue or indicator to display in lieu of the first indicator.

Still referring to FIG. 6, an economic instrument 621 is illustrated. Instrument 621 is configured to provide visual cueing to the pilot with regard to economic operation of the aircraft. Instrument 621 can include a bug 623 communicating how economically the aircraft is being operated. An optimum economic operation mark 625 can be included on the economic scale to communicate the optimum economic operation level, thereby allowing the pilot to modify the flight operation to attempt to get bug 623 to line up with economic operation mark 625. It should be appreciated that method 301 can be utilized and modified so that economic instrument 621 portrays and overall efficiency based upon a variety of factors (fuel economy, component wear rates, maintenance inducement, etc.) or only a single factor. For example, economic instrument 621 can be configured to cue the pilot to change flight operation to arrive at the most conservative fuel usage. It should be appreciated that selector 615 can be utilized to select the output of instrument 621.

In another embodiment, economic instrument 621 is configured as a real time "rate of damage" indicator communicating rate of damage being experienced by the aircraft due to the present flying conditions (such as airspeed, angles of bank, etc.) or options (such as rate of climb). Mid scale location of bug 623 indicates time weighted operation on par with nominal vehicle structural design criteria. Operation in more severe fashion moves the bug 623 upscale. The method 301 can allow upscale motions to happen quickly, so high-damage operation is readily apparent to the pilot. Operation in a less severe fashion moves the needle downscale.

In another embodiment, a range ring instrument 627 can inform the pilot that operational changes can optimize available fuel range of the aircraft. For example, a first ring 229 corresponds with the real time range of the aircraft based upon the actual current operation. First ring 229 is a function of existing rate of fuel burn and groundspeed, which is a function of airspeed and ambient winds. A second ring 631 corresponds with the largest fuel range that the pilot could achieve if the pilot were to operate the aircraft in the most fuel efficient manner (i.e. max thermodynamic efficiency, minimum aerodynamic drag, best wind, etc.). Ring 631 is calculated in method 301. In one aspect of the embodiment, the pilot can select ring 631 and receive instructions (either orally or visually) that describe the flight changes that need to be made in order to achieve the maximum fuel range depicted by ring 631. As the pilot makes the flight changes, ring 629 converges to ring 631. Further, if the pilot chooses to incorporate only a portion of the recommended changes, then ring 629 will only partially expand toward ring 631. It should be appreciated that as the flight continues and fuel is burned, both rings 629 and 631 become smaller.

Economic helicopter operation is a multivariable optimization problem that is preferably cued to the aircraft pilot with multiple indicators. Providing multiple cues via one or more indicators in conjunction with the associated flight instrument facilitates simple and intuitive economic operation of the aircraft. The cues presented can be limited to only the dominant cue (e.g. the parameter whose adjustment offers the most direct benefit) or the cues presented can be weighted so that they are always all present, but less influential adjustments can be reduced in magnitude to appear less important.

Figure 7:
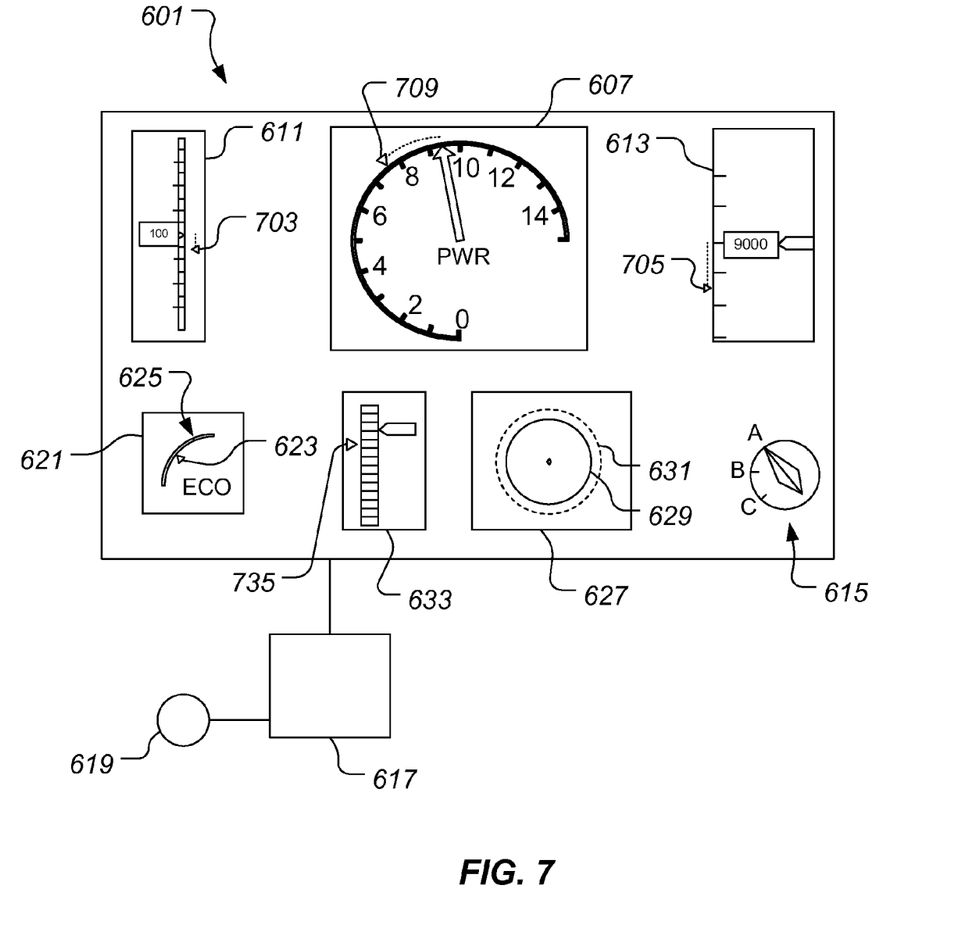
FIG. 7 is a graphical view of a flight instrument panel, according to an embodiment of the present application.

Referring to FIG. 7, flight instrument panel 701 is illustrated, which is another example embodiment of the flight instrument panel 601. Flight instrument panel 701 is substantial similar to flight instrument panel 601, except that indicators 603, 605, 609, and 635 are replaced with bugs 703, 705, 709, and 735 respectively. Bugs 703, 705, 709, and 735 are located at the cued location. The trailing dashed lines can be used as a measure of success indications (or history markers) for the pilot. The measure of success indicators can automatically reset after a period of time, or the pilot can reset the measure of success indicators; notwithstanding, the measure of success indicators allow the pilot to monitor the flight changes. It should be appreciated that bugs 703, 705, 709, and 735, as well as indicators 603, 605, 609, and 635 are merely exemplary of the implementation specific shapes and sizes that can be used for cueing the pilot.

Figure 8:
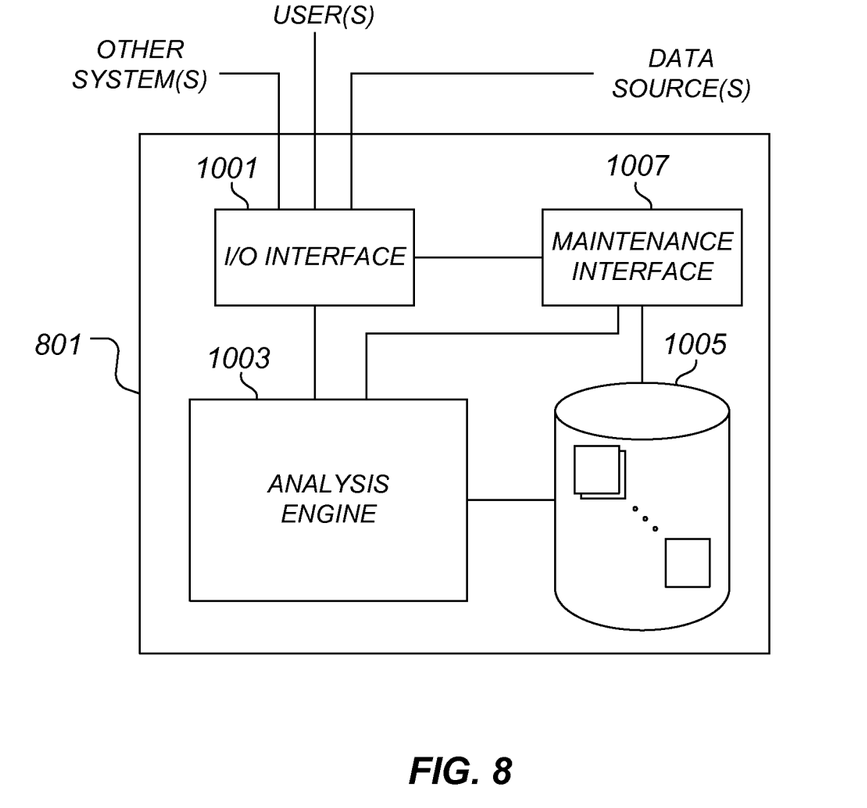
FIG. 8 is a schematic view of an exemplary computer system, according to an embodiment of the present application.

Referring to FIG. 8, an exemplary embodiment of computer 801 is illustrated. Computer 801 can be configured to perform any of the methods disclosed herein. Computer 801 can be a stand alone hardware located on or off the aircraft. Further, computer 801 can be incorporated into existed aircraft hardware. Computer 801 can include an input/output (I/O) interface 1001, an analysis engine 1003, a database 1005, and a maintenance interface 1007. Alternative embodiments can combine or distribute the input/output (I/O) interface 1001, analysis engine 1003, database 1005, and maintenance interface 1007, as desired. Embodiments of the computer 801 can include one or more computer systems that include one or more processors and memories configured for performing tasks described herein. This can include, for example, a computer having a central processing unit (CPU) and non-volatile memory that stores non-transitory software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1001 provides a communication link between external users, systems, and data sources and components of the computer 801. The I/O interface 1001 can be configured for allowing one or more users to input information to the computer 801 via any known input device. Examples can include a keyboard, mouse, touch screen, microphone, and/or any other desired input device. The I/O interface 1001 can be configured for allowing one or more users to receive information output from the computer 801 via any known output device. Examples can include a display monitor, a printer, a speaker, and/or any other desired output device. The I/O interface 1001 can be configured for allowing other systems to communicate with the computer 801. For example, the I/O interface 1001 can allow one or more remote computer(s) to access information, input information, and/or remotely instruct the computer 801 to perform one or more of the tasks described herein. The I/O interface 1001 can be configured for allowing communication with one or more remote data sources. For example, the I/O interface 1001 can allow one or more remote data source(s) to access information, input information, and/or remotely instruct the computer 801 to perform one or more of the tasks described herein.

The database 1005 provides persistent data storage for computer 801. While the term "database" is primarily used, a memory or other suitable data storage arrangement may provide the functionality of the database 1005. In alternative embodiments, the database 1005 can be integral to or separate from the computer 801 and can operate on more than one computer. The database 1005 preferably provides non-volatile data storage for any information suitable to support the operation of the computer 801, including various types of data.

The maintenance interface 1007 is configured to allow users to maintain desired operation of the computer 801. In some embodiments, the maintenance interface 1007 can be configured to allow for reviewing and/or revising the data stored in the database 1005 and/or performing any suitable administrative tasks commonly associated with database management. This can include, for example, updating database management software, revising security settings, and/or performing data backup operations. In some embodiments, the maintenance interface 1007 can be configured to allow for maintenance of the analysis engine 1003 and/or the I/O interface 1001. This can include, for example, software updates and/or administrative tasks such as security management and/or adjustment of certain tolerance settings. The analysis engine 1003 can include various combinations of one or more processors, memories, and software components.

The particular embodiments disclosed herein are illustrative only, as the system may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A system for an aircraft, the system comprising:
a processor for calculating a rate of damage of a component of the aircraft by analyzing a usage data in an algorithm; and
an output device for communicating an operational change that affects the rate of damage of the component of the aircraft;
wherein the rate of damage is a rate of maintenance inducing operation.

2. The system according to claim 1, wherein the output device is a visual indicator on an instrument panel of the aircraft.

3. The system according to claim 2, wherein the instrument panel includes a glass cockpit display.

4. The system according to claim 1, wherein the output device communicates an altitude change that changes the rate of damage of the component.

5. The system according to claim 1, wherein the output device communicates an airspeed change that changes the rate of damage of the component.

6. The system according to claim 1, wherein the output device communicates a power change that changes the rate of damage of the component.

7. The system according to claim 1, wherein the output device communicates a rotor speed change that changes the rate of damage of the component.

8. The system according to claim 1, wherein the usage data is measurement data from a sensor.

9. The system according to claim 1, wherein the aircraft is a helicopter.

10. The system according to claim 1, wherein the processor is onboard the aircraft.

11. The system according to claim 1, wherein the usage data is vehicle state and condition data comprising at least one of:
an airspeed;
an altitude; and
an acceleration.

12. A system for an aircraft, the system comprising:
a processor for calculating a rate of damage of a component of the aircraft by analyzing a usage data in an algorithm; and
an output device for communicating an operational change that affects the rate of damage of the component of the aircraft;
wherein the output device is a tactile cue device;
wherein the tactile cue device is an actuator that produces a force feedback in a cockpit control device.

13. A system for an aircraft, the system comprising:
a processor for calculating a rate of damage of a component of the aircraft by analyzing a usage data in an algorithm; and
an output device for communicating an operational change that affects the rate of damage of the component of the aircraft;
wherein the output device is an aural cue device;
wherein the aural cue device is configured to produce at least one of a tone, a recorded speech, and a synthesized speech.

14. A system for an aircraft, the system comprising:
a processor for calculating a rate of damage of a component of the aircraft by analyzing a usage data in an algorithm; and
an output device for communicating an operational change that affects the rate of damage of the component of the aircraft;
wherein the rate of damage is a rate of component replacement inducing operation.

15. A system for an aircraft, the system comprising:
a processor for calculating a rate of damage of a component of the aircraft by analyzing a usage data in an algorithm;
an output device for communicating an operational change that affects the rate of damage of the component of the aircraft; and
a selector configured for input, the input being a factor that is important to the rate of damage of the aircraft, the factor being at least one of:
a rate of maintenance inducing flight operation; and
a rate of component replacement inducing flight operation.

16. A system for an aircraft, the system comprising:
a processor for calculating a rate of damage of a component of the aircraft by analyzing a usage data in an algorithm;
an output device for communicating an operational change that affects the rate of damage of the component of the aircraft;
a database to provide data storage;
an input/output device to provide a communication link; and
a maintenance interface to maintain desired operation of the system.

17. A system for an aircraft, the system comprising:
a processor for calculating a rate of damage of a component of the aircraft by analyzing a usage data in an algorithm; and
an output device for communicating an operational change that affects the rate of damage of the component of the aircraft;
wherein the processor is part of a computer station offboard the aircraft.

* * * * *